US008796943B2

(12) United States Patent
Miyamichi (10) Patent No.: US 8,796,943 B2
(45) Date of Patent: Aug. 5, 2014

(54) LED LAMP AND ILLUMINATION DEVICE INCLUDING THE LED LAMP

(75) Inventor: Saburo Miyamichi, Osaka (JP)

(73) Assignee: M-System Co., Ltd., Osaka (JP)

( * ) Notice: Subject to any disclaimer, the term of this patent is extended or adjusted under 35 U.S.C. 154(b) by 0 days.

(21) Appl. No.: 13/981,063

(22) PCT Filed: Apr. 9, 2012

(86) PCT No.: PCT/JP2012/059731
§ 371 (c)(1),
(2), (4) Date: Jul. 22, 2013

(87) PCT Pub. No.: WO2013/153612
PCT Pub. Date: Oct. 17, 2013

(65) Prior Publication Data
US 2014/0035463 A1    Feb. 6, 2014

(51) Int. Cl.
*H05B 37/02* (2006.01)
(52) U.S. Cl.
USPC ............................. 315/224; 315/307; 315/308
(58) Field of Classification Search
CPC ............................. H05B 41/00; H05B 31/0051
USPC ............... 315/178–183, 185 R–186, 193, 315/200 R–208, 209, 291, 307–308, 312, 315/224
See application file for complete search history.

(56) References Cited

U.S. PATENT DOCUMENTS

| 7,911,149 | B2 | 3/2011 | Schaible et al. | |
| 2007/0182347 | A1* | 8/2007 | Shteynberg et al. | 315/312 |
| 2008/0197786 | A1* | 8/2008 | Schaible et al. | 315/224 |
| 2010/0207536 | A1* | 8/2010 | Burdalski et al. | 315/224 |

FOREIGN PATENT DOCUMENTS

| JP | 2010-034012 A | 2/2010 |
| JP | 2010-212162 A | 9/2010 |
| JP | 3174463 U | 3/2012 |
| TW | 200952551 A | 12/2009 |
| WO | 2008136458 A1 | 11/2008 |

OTHER PUBLICATIONS

International Search Report corresponding to PCT/JP2012/059731, dated Jul. 10, 2012.

* cited by examiner

*Primary Examiner* — Douglas W Owens
*Assistant Examiner* — Henry Luong
(74) *Attorney, Agent, or Firm* — Lowe Hauptman & Ham, LLP (57) ABSTRACT

In an LED lamp according to one embodiment of the present invention, a PWM control unit 25 performs PWM control of a current i flowing through an LED unit 24 using by driving a pulse at a frequency higher than a predetermined frequency when a frequency of an external alternating current inputted between input terminal parts 20a, 20b is lower than the predetermined frequency, and does not perform PWM control of the current i flowing through the LED unit 24 when a frequency of the external AC inputted between the input terminal parts 20a, 20b is higher than the predetermined frequency. Accordingly, by replacing a previously mounted fluorescent lamp, the LED unit drives pulses at a high frequency and lights up for illumination, regardless of whether a ballast of an illumination device is of a glow starter, rapid starter or inverter lighting type.

9 Claims, 9 Drawing Sheets

PRIOR ART

LED LAMP AND ILLUMINATION DEVICE INCLUDING THE LED LAMP

RELATED APPLICATIONS

The present application is a National Phase of International Application Number PCT/JP2012/059731, filed Apr. 9, 2012.

TECHNICAL FIELD

The present invention relates to an LED lamp, and an illumination device including the LED, capable of driving an LED unit incorporated therein at a high frequency to light even when mounted in place of fluorescent lamps of various glow starter, rapid start and inverter lighting device types distributed on the market.

BACKGROUND ART

As typical lighting devices for fluorescent lamps (usually referred to as fluorescent lights) used in general, there have conventionally been lighting devices for various fluorescent lamps such as those of the glow starter and rapid start types, which are also known as magnetic ballasts, or the inverter type, also known as an electronic ballast.

The inverter type fluorescent lamp lighting devices, which have rapidly been becoming widespread in recent years in particular, are devices which convert an AC into a DC and then cause an inverter circuit constituted by a transistor, a capacitor, a choke coil and the like to generate a high voltage at a high frequency (20 kHz to 100 kHz) near a resonance frequency.

The high voltage switches on the fluorescent lamp, and thereafter a current flowing through the fluorescent lamp stably lights the fluorescent lamp at a lower voltage.

This is superior to the conventional magnetic ballasts of the glow starter and rapid start types using choke coils in terms of such characteristics as lower power, higher efficiency, usability at both 50 Hz or 60 Hz, lower noise and indiscernibility of flicker.

These will now be explained with reference to the drawings.

Figure 8:
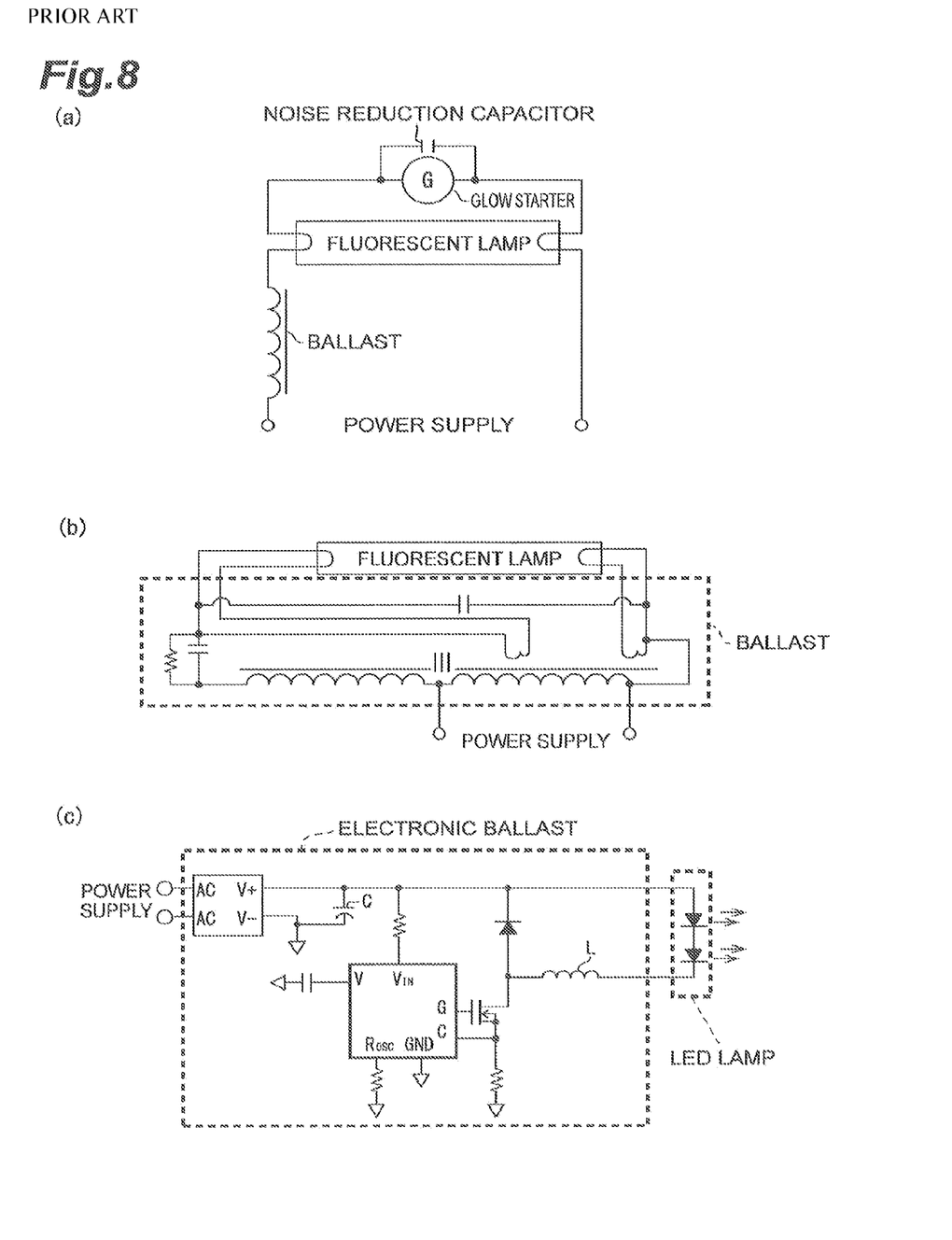
FIGS. 8(a), 8(b) and 8(c) are diagrams illustrating examples of ballasts of glow starter, rapid start and inverter types, respectively.

FIG. 8(a) is a diagram illustrating an example of glow starter type ballasts, FIG. 8(b) is a diagram illustrating an example of rapid start type ballasts, and FIG. 8(c) is a diagram illustrating an example of inverter type ballasts.

The glow starter type ballast illustrated in FIG. 8(a), which is the most popular type, preheats electrodes (also referred to as filaments; the same hereinafter) of a fluorescent lamp with a starting device using a glow starter (G), so as to enable lighting in a few seconds after switching on.

The rapid start type ballast illustrated in FIG. 8(b), which is used in combination with a rapid start type lamp, is lit instantaneously and simultaneously with preheating when switched on.

On the other hand, the ballast of the inverter type lighting device illustrated in FIG. 8(c) converts an AC within the AC input voltage range of 85 to 450 V into a DC and then causes an integrated circuit to drive an LED lamp at a high frequency such as that mentioned above (e.g. see page 4 and FIG. 2 of Patent Literature 1).

While a choke coil L is inserted in series with the LED lamp in order to smooth the current flowing through the LED lamp in this case, an electrolytic capacitor (not depicted) is typically inserted in parallel with the LED lamp.

Figure 9:
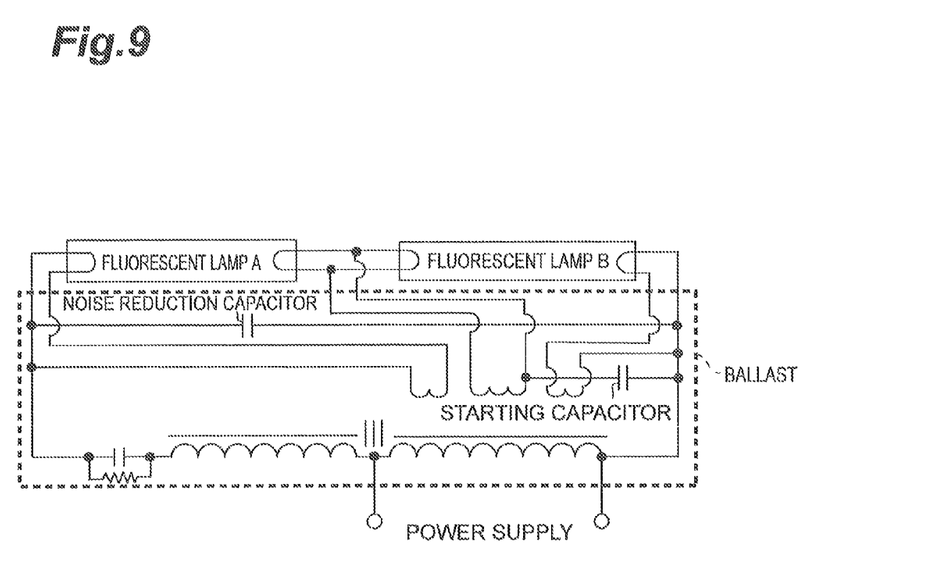
FIG. 9 is a diagram illustrating an example of a series rapid type ballast.

FIG. 9 is a diagram illustrating an example in which two fluorescent lamps are connected in series to a series rapid ballast.

This configuration, in which two fluorescent lamps are connected in series and lit by a single ballast, is simpler and less expensive than one using two single-lamp ballasts or a flickerless ballast.

When powered, the electrodes of each of fluorescent lamps A and B are preheated, and the secondary voltage does not shift to normal discharging but attains a weakly discharging state due to a starting capacitor having a high impedance. The lowered voltage at both ends of the starting capacitor caused by the weak discharge current is applied to the fluorescent lamp B, and starts to discharge the fluorescent lamp B.

When discharging occurs in both fluorescent lamps, the starting capacitor at the high impedance is placed into a substantially non-operating state, so that normal discharging is generated in both fluorescent lamps, and a lit state is maintained.

Thus discharging lamps one by one in such a series connection can light two fluorescent lamps in series at a relatively low secondary voltage, but is disadvantageous in that both of the fluorescent lamps fail to light when one of them is removed for power saving or has burnt out.

CITATION LIST

Patent Literature

Patent Literature 1: Japanese Laid-Open Patent Application No. 2010-34012

SUMMARY OF INVENTION

Technical Problem

For saving power, lengthening the life of lamps and so forth, more and more LED lamps have been seen in use as being mounted to various types of ballasts mentioned above in place of the conventional fluorescent lamps.

In this case, the peak value and frequency of the AC inputted to a pair of input terminal parts of an LED lamp greatly vary depending on types of ballasts of lighting devices to be mounted therewith, which makes it necessary to use respective LED lamps corresponding to the ballasts.

In a glow starter or rapid start type fluorescent lamp lighting device, for example, the output (secondary output) of the ballast is controlled at about 200 V AC so as to correspond to the power-supply-side input of 100 V to 240 V AC (50 Hz or 60 Hz), but since the frequency is not controlled so as to become a high frequency, the frequency is the same as that of the power-supply-side input.

Therefore, in the LED lamp, an inner rectifier circuit rectifies the AC to a DC, so as to enable use as an AC coinciding with the frequency of the power-supply-side input, and then the circuit configuration of an LED unit of the LED lamp (the configuration of a circuit in which a plurality of LEDs are connected; the same hereinafter) is fixed so as to yield a desirable illuminance, and the current flowing through each LED is made to fall within a desirable range.

Hence, when the ballast of the fluorescent lamp lighting device is of the glow starter or rapid start type, it has conventionally been possible for each LED incorporated therein to be lit by using a dedicated LED lamp attachable to a lamp socket for a fluorescent lamp.

On the other hand, as mentioned above, even when the power-supply-side input is 100 V to 240 V AC (50 Hz or 60

Hz) in the fluorescent lamp lighting device of the inverter type, the output (secondary output) of the ballast has been controlled so as to become a fixed voltage of about 280 V AC (under no load), and since the frequency is under constant-current or constant-power control to fall within the range of 20 kHz to 100 kHz, the circuit configuration of the LED unit of the LED lamp is fixed so as to yield a desirable illuminance, and the current flowing through each LED is made to fall within a desirable range.

Therefore, when the ballast of the fluorescent lamp lighting device is of the inverter type, it has been necessary to take commensurate measures on the lighting device or LED lamp side that involve changing the circuit construction on the lighting device side, employ a conversion adaptor necessary for direct connection, or the like, in order that the power on the power supply side can directly be supplied to an AC/DC converter (rectifier circuit) incorporated in the LED lamp bypassing (not driving) the inverter type ballast.

Furthermore, when lighting an LED lamp in the inverter type, it has been necessary to replace the existing lamp with a set of a lighting device, incorporating an inverter type ballast therein, and a dedicated LED lamp.

As shown above, the need for selecting and deselecting (verifying compatibility of) LED lamps according to types of lighting devices, or performing additional operations such as circuit construction and direct connection on the lighting device side, have caused users to investigate the current state for implementation and construction, adjust the construction period, and so forth, which are troublesome and increase the implementation cost.

That is, these factors have been hindering LED lamps from being employed in conventional fluorescent lamp lighting devices in homes and offices.

As a result, previous fluorescent lamps continue to be used as they are, thereby greatly obstructing market diffusion of LED lamps, which can greatly contribute to saving power and lengthening the life of lamps.

It is an object of the present invention to provide an LED lamp, and an illumination device including the LED lamp, capable of being lit by driving pulses at a high frequency, by replacing the previously mounted fluorescent lamp (or LED lamp), regardless of whether a ballast of an illumination device is of a glow starter, rapid start or inverter lighting type.

Solution to Problem

For solving the conventional problems mentioned above, the LED lamp according to the present invention is an LED lamp including a pair of input terminal parts, a rectifier circuit unit rectifying an AC, inputted from the outside to the pair of input terminal parts, to a DC, and an LED unit emitting light by electrification of the DC outputted from the rectifier circuit unit; wherein a PWM control unit capable of performing PWM control of a current flowing through the LED unit according to a duty ratio is provided in a circuit between the rectifier circuit unit and the LED unit; and wherein the PWM control unit is switchable between a case where the PWM control of the current flowing through the LED unit is performed, and a case where the PWM control of the current flowing through the LED unit is not performed, according to a frequency of the external AC fed to the pair of input terminal parts.

This makes it possible to light the LED lamp for illumination, which is capable of being lit by pulse-driven PWM, by replacing a previously mounted fluorescent lamp (or LED lamp), regardless of whether a ballast of the fluorescent lamp lighting device is of the glow starter, rapid start or inverter lighting type.

Furthermore, in addition to the foregoing configuration, the LED lamp of the present invention is one wherein preferably the PWM control unit performs the PWM control of the current flowing through the LED unit by driving a pulse at a frequency higher than a predetermined frequency when a frequency of an external AC inputted to the pair of input terminal parts is lower than the predetermined frequency, and does not perform the PWM control of the current flowing through the LED unit when the frequency of the external AC inputted to the pair of input terminal parts is higher than the predetermined frequency.

This configuration makes it possible to light the LED lamp for illumination, which is capable of being lit by driving a pulse at a frequency higher than the predetermined frequency, by replacing the previously mounted fluorescent lamp (or LED lamp), regardless of whether the ballast of the fluorescent lamp lighting device is of the glow starter, rapid start or inverter lighting type.

Therefore, this can easily eliminate the need for selecting and deselecting (verifying compatibility of) LED lamps according to types of lighting devices, or performing additional operations such as circuit construction and direct connection on the lighting device side, that cause users to investigate the current state for implementation and construction, adjust the construction period, and so forth, which are troublesome and increase the implementation cost.

As a result, the obstacles to LED lamps being employed in conventional fluorescent lamp lighting devices (or LED lighting devices) in homes and offices are overcome.

This makes it possible for LED lamps, which can greatly contribute to saving power and lengthening the life of lamps, to become widespread in the market.

When the ballast of a fluorescent lamp lighting device is of the glow starter or rapid start type, for example, the frequency of the AC inputted from the pair of input terminal parts is a utility power frequency of 50 Hz or 60 Hz.

Therefore, the current flowing through the LED unit is PWM-controlled by driving pulses at a frequency higher than at least a predetermined frequency (e.g. 5 kHz), thus enabling the PWM control unit to repeatedly switch the current flowing through the LED unit on/off at high speed, and a flicker-free, stable effective value (RMS value) to be obtained.

When the ballast of the fluorescent lamp lighting device is of the inverter type, on the other hand, the AC inputted from the pair of input terminal parts has a high frequency of 20 kHz to 100 kHz, and thus the PWM control unit does not perform PWM control, the frequency rectified by the rectifier circuit unit is used as is (a ripple voltage waveform part superposed on the DC having a double frequency in the case of full-wave rectification), and thus the current flowing through the LED unit can obtain a flicker-free, stable effective value (RMS value) by control (e.g. PWM control) of the external inverter type ballast.

This reliably prevents the same kind of control systems from being superposed outside and inside of the LED lamp, and eliminates causes giving rise to inconsistencies such as instability in the current flowing through the LED unit.

Furthermore, in addition to the foregoing configuration, the LED lamp of the present invention is one wherein preferably a bypass circuit unit is provided between a cathode-side terminal of the LED unit and a ground-side output terminal of the rectifier circuit unit, wherein the bypass circuit unit includes a switching device and a high-pass filter circuit outputting a drive voltage for the switching device, and wherein the switching device does not allow a current to flow from the cathode-side terminal of the LED unit to the ground-side output terminal of the rectifier circuit unit when the AC inputted to the pair of input terminal parts has a frequency lower than the predetermined frequency, and allows a current to flow from the cathode-side terminal of the LED unit to the ground-side output terminal of the rectifier circuit unit when the AC inputted to the pair of input terminal parts has a frequency higher than the predetermined frequency.

This configuration allows the AC inputted from the input terminal of the rectifier circuit, when higher than the predetermined frequency, to bypass (circumvent) the switching device of the PWM control unit for performing PWM control of the current flowing through the LED unit, thereby preventing the PWM control unit incorporated in the LED lamp from performing the PWM control.

Furthermore, in addition to the foregoing configuration, the LED lamp of the present invention is one wherein preferably the switching device of the bypass circuit unit is an N-channel MOSFET controlling a current flow between drain and source terminals according to a gate voltage inputted to a gate terminal, wherein the drain terminal is connected to the cathode-side terminal of the LED unit, wherein the source terminal is connected to the ground-side output terminal of the rectifier circuit unit, wherein the gate terminal is connected to any one of the input terminals of the rectifier circuit unit through the high-pass filter circuit, and wherein the high-pass filter circuit outputs a gate voltage to the gate terminal driven so as to allow a current to flow from the drain terminal to the source terminal when the AC inputted to the pair of input terminal parts has a frequency higher than the predetermined frequency, and outputs a gate voltage to the gate terminal driven so as not to allow a current to flow from the drain terminal to the source terminal when the AC inputted to the pair of input terminal parts has a frequency lower than the predetermined frequency.

According to this configuration, the N-channel MOSFET functions as the switching device of the bypass circuit, thus enabling a current to flow to the LED unit with sufficient margin, and the current can be inhibited from flowing into the PWM control unit.

That is, since the PWM control unit is bypassed (circumvented) when the AC inputted from the input terminals of the rectifier circuit unit has a frequency higher than the predetermined frequency, the current flowing through the LED unit can be prevented from flowing into the PWM control unit, and prevents the PWM control unit from performing PWM control.

Furthermore, in addition to the foregoing configuration, the LED lamp of the present invention is one wherein preferably the high-pass filter circuit includes a first capacitor, a first resistor connected in series to the first capacitor so as to have one terminal connected to one terminal of the first capacitor, a first diode connected in a forward direction from the other terminal of the first resistor to the gate terminal, a second capacitor connected between the source and gate terminals, a second resistor connected between the source and gate terminals, a zener diode connected in a forward direction from the source terminal to the gate terminal, and a second diode connected in a forward direction from the source terminal to the other terminal of the first resistor, wherein the other terminal of the first capacitor is connected to any one of the input terminals of the rectifier circuit unit.

This configuration enables a filter function that allows only a current having a frequency higher than the predetermined frequency to pass to the next stage, and causes the switching device of the bypass circuit reliably to switch on/off according to the frequency.

As a result, the current flows to the subsequent stage only when the AC inputted from the input terminals of the rectifier circuit unit is higher than the predetermined frequency, thus enabling the N-channel MOSFET serving as the switching device to be reliably switched on, and enabling prevention of PWM control of the current flowing through the LED unit.

Furthermore, in addition to the configurations mentioned above, the LED lamp of the present invention is one wherein preferably the predetermined frequency is a frequency higher than 65 Hz but lower than 20 kHz.

This configuration makes it possible to clearly distinguish between a frequency (60±1 Hz) in the case where the ballast is of the glow starter or rapid start type, and a frequency (20 kHz to 100 kHz) in the case of the inverter type distributed on the market, even when taking account variations including precision of power supply frequency, thus enabling switching between the case where the pulse-driven PWM control is performed, and the case where it is not performed, according to the results of distinguishing, and enabling lighting of the LED lamp for illumination capable of being lit by driving a pulse at a high frequency.

Since the predetermined frequency to be distinguished is a frequency which is lower than 20 kHz and falls within an audible region (a frequency band which can be sensed by humans as sound), a frequency in a higher frequency band used for driving pulses for PWM control is less likely to be felt as uncomfortable noise.

Furthermore, the illumination device of the present invention is one including the LED lamp having any of the configurations mentioned above.

According to this configuration, the illumination device of the present invention is mounted with the LED lamp according to the present invention, and thus it is not necessary to newly provide a ballast for modulating the LED unit on the illumination device side, and simply supplying an external AC to a pair of input terminal parts can light it as illumination.

Furthermore, the illumination device itself is mounted with no ballast and thus has a simplified configuration, thereby easily eliminating the need for selecting and deselecting (verifying compatibility of) LED lamps according to types of lighting devices, or performing additional operations such as circuit construction and direct connection on the lighting device side, that cause users to investigate the current state for implementation and construction, adjust the construction period, and so forth, which are troublesome and increase the implementation cost.

Advantageous Effects of Invention

According to the LED lamp and the illumination device including the LED lamp of the present invention, it is possible to provide an LED lamp, and an illumination device including the LED lamp, capable of being lit by driving a pulse at a high frequency, regardless of whether the ballast of the fluorescent lamp lighting device is of the glow starter, rapid start or inverter lighting type.

BRIEF DESCRIPTION OF DRAWINGS

FIG. 7(a) is a diagram illustrating a part of a circuit which makes a threshold voltage variable according to the magnitude of a high voltage (HV), while FIG. 7(b) is an overall block diagram in which an LED lamp in an embodiment is connected in series to a series rapid type ballast.

DESCRIPTION OF EMBODIMENTS

Figure 1:
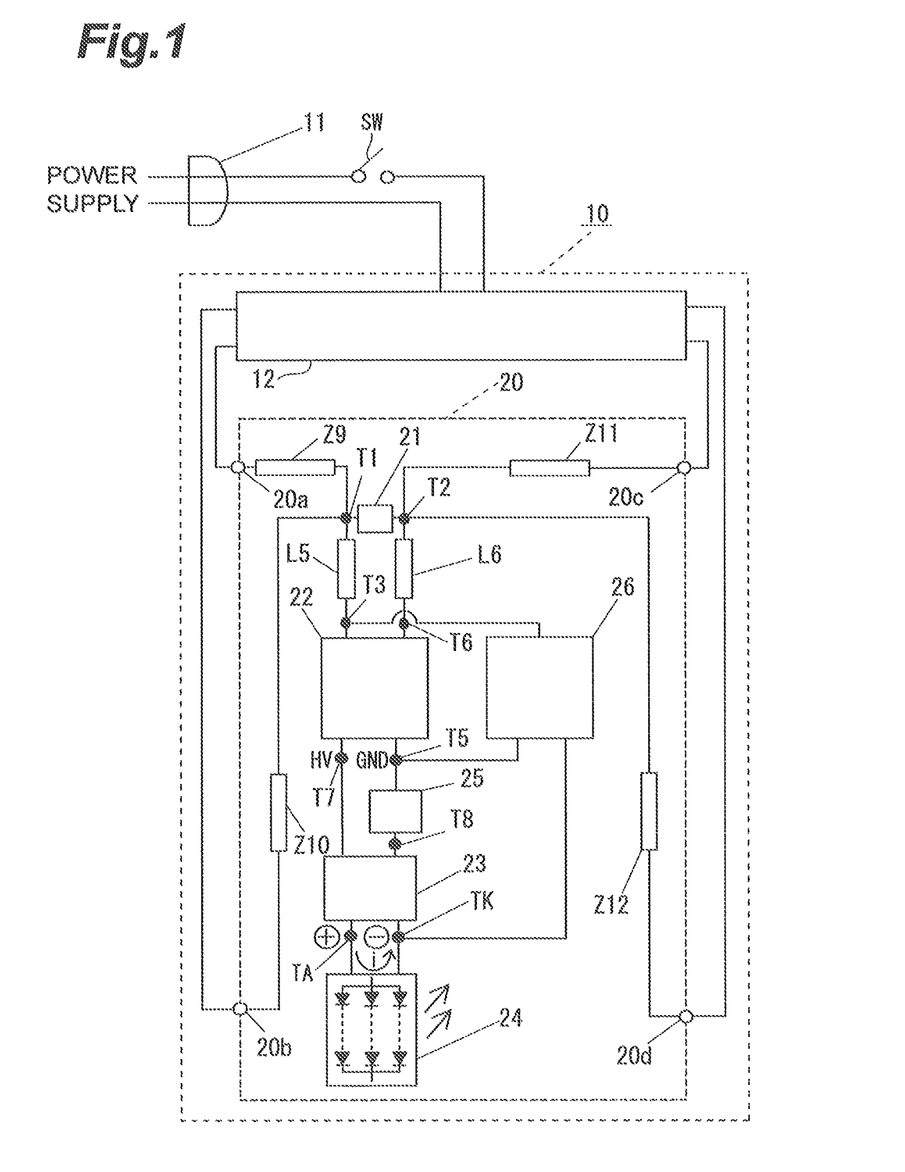
FIG. 1 is a block diagram illustrating the whole circuit of the illumination device according to an embodiment of the present invention.
Figure 2:
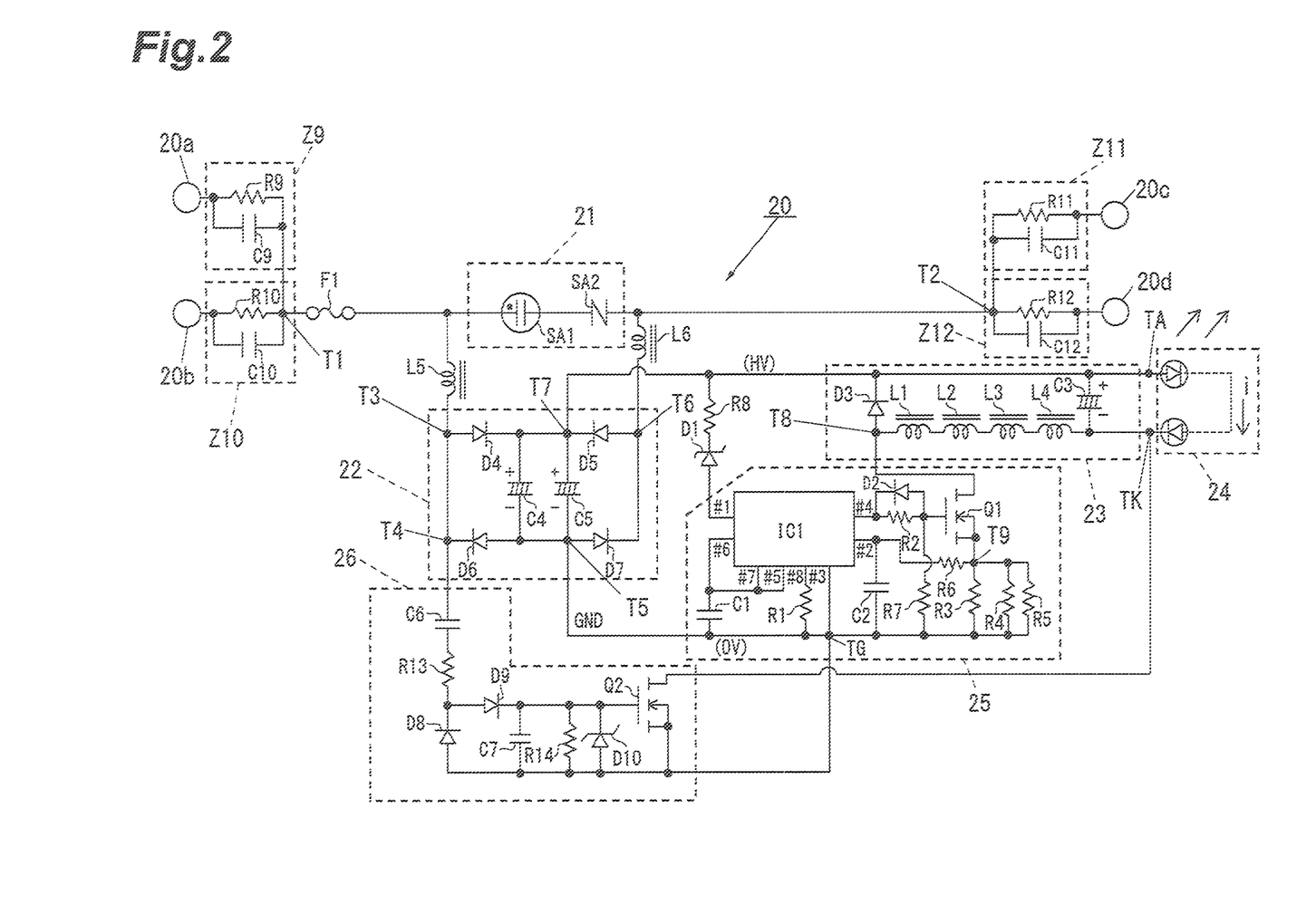
FIG. 2 is a circuit diagram of the LED lamp in an embodiment of the present invention.
Figure 3:
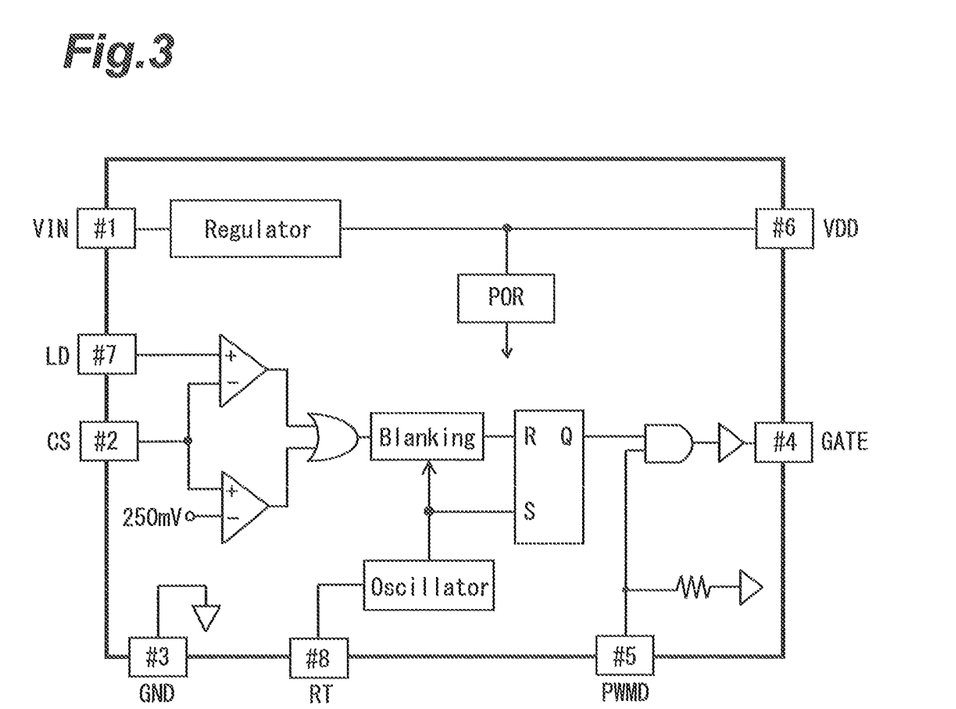
FIG. 3 is a block diagram illustrating the inside of an integrated circuit IC1.

Embodiments of the present invention will be explained in detail below with reference to the drawings.
Embodiments FIG. 1 is a block diagram illustrating the whole circuit of the illumination device according to an embodiment of the present invention; FIG. 2 is a circuit diagram of the LED lamp in the embodiment of the present invention; FIG. 3 is a block diagram illustrating the inside of an integrated circuit IC1; FIGS. 4(a) to 4(e) are voltage waveform charts at respective measurement points in a case where a glow starter type is adopted for a ballast of the illumination device in the embodiment of the present invention; FIGS. 5(a) to 5(e) are voltage waveform charts at respective measurement points in a case where a rapid start type is adopted for the ballast of the illumination device in the embodiment of the present invention; FIGS. 6(a) to 6(e) are voltage waveform charts at respective measurement points in a case where an inverter type is adopted for the ballast of the illumination device in the embodiment of the present invention; and FIG. 7(a) is a diagram illustrating a part of a circuit which makes a threshold voltage variable according to the magnitude of a high voltage (HV), while FIG. 7(b) is an overall block diagram in which LED lamps in an embodiment are connected in series to a series rapid type ballast.

First, as illustrated in FIG. 1, an illumination device 10 according to an embodiment of the present invention comprises a plug 11 that is connected in order to supply power from an external power supply of a household AC of 100 to 240 V (50 Hz or 60 Hz), for example, a ballast 12 controlling the power inputted from the plug 11 in order to light a fluorescent lamp, and an LED lamp 20 to which a predetermined voltage is inputted between a pair of input terminal parts (between input terminal parts 20a, 20c) according to the type of the ballast 12.

Here, the ballast 12 may be any known glow starter, rapid start or inverter type for lighting existing fluorescent lamps.

Since the LED lamp 20 operates normally as long as the external power supply has an AC of 100 to 240 V (50 Hz or 60 Hz), the external power may be directly inputted to the LED lamp 20, bypassing the ballast 12.

Here, a line outputting an AC from the ballast 12 is connected so as to enable inputting between either one or both of the pair of input terminal parts (between input terminal parts 20a, 20c) and/or a pair of input terminal parts (between input terminal parts 20b, 20d).

On the other hand, an input circuit unit Z9 constituted by an RC parallel circuit composed of a resistor R9 and a capacitor C9 is connected between the input terminal part 20a of the LED lamp 20 and a terminal T1 (see FIG. 2).

Similarly, an input circuit unit Z10 constituted by an RC parallel circuit composed of a resistor R10 and a capacitor C10 is connected between the input terminal part 20b of the LED lamp 20 and the terminal T1 (see FIG. 2).

Similarly, an input circuit unit Z11 constituted by an RC parallel circuit composed of a resistor R11 and a capacitor C11 is connected between the input terminal part 20c of the LED lamp 20 and a terminal T2 (see FIG. 2).

Similarly, an input circuit unit Z12 constituted by an RC parallel circuit composed of a resistor R12 and a capacitor C12 is connected between the input terminal part 20d of the LED lamp 20 and the terminal T2 (see FIG. 2).

Therefore, a resistance value of about several Ω to about 100Ω is selected for each of the resistors R9, R10 between the input terminal parts 20a, 20b so as to correspond to the resistance component of a filament of the fluorescent lamp.

Similarly, a resistance value of about several Ω to about 100Ω is selected for each of the resistors R11, R12 between the input terminal parts 20c, 20d so as to correspond to the resistance component of the filament of the fluorescent lamp.

When the resistance values of the resistors R9 to R12 are selected as mentioned above, these resistors R9 to R12 can act as dummy resistors even if the ballast 12 is of the inverter type adapted to automatically detect whether or not a fluorescent lamp is mounted on the load side (whether there is conduction through the filament resistance) and outputs no power when the fluorescent lamp is not mounted (case where no fluorescent lamp is mounted), and thus power is normally supplied to the LED lamp 20.

Furthermore, a protection circuit unit 21 (see FIG. 2) is inserted between the terminals T1, T2.

In the protection circuit unit 21, a two-electrode discharge tube SA1, within which an inert gas such as neon or argon is enclosed, and a varistor SA2 are connected in series.

Appropriately setting the discharge starting voltage of the two-electrode discharge tube SA1 and the clamping voltage of the varistor SA2 can suppress the surge voltage entering between the terminals T1 and T2 from the power supply side to a peak value of about 400 V or lower. Furthermore, combining the two-electrode discharge tube SA1 and the varistor SA2 in series allows the varistor SA2 to effectively prevent a follow current from being caused by the two-electrode discharge tube SA1 continuously discharging after the surge voltage ends.

This absorbs a surge current, even when a lightning surge or lightning-induced surge, for example, enters from the external input power supply side, and inhibits the surge current from advancing into a rectifier circuit unit 22 side.

Hence, electronic components such as diodes and capacitors constituting the rectifier circuit unit 22 and LED unit 24 can be protected.

A coil L5 is inserted between the terminal T1 and a terminal T3 on one input side of the rectifier circuit unit 22, and a coil L6 is similarly inserted between the terminal T2 and a terminal T6 on the other input side of the rectifier circuit unit 22.

As a consequence, the coils L5, L6 act as impedances against high-frequency pulses.

Therefore, when the ballast 12 is of the glow starter or rapid start type, for example, a switching device Q1 switches on/off, and thus prevents switching noises (high-frequency noise pulses) thereof from flowing out to the external AC (input power supply) side through any of the input terminal parts 20a to 20d.

Furthermore, when the ballast 12 is of the inverter type, on the other hand, an AC at a high frequency of 20 kHz to 100 kHz is inputted, and thus the coils L5, L6 act as (reactive power loss) loads without effective power loss.

This allows power to be stably outputted from the inverter type ballast 12 by ensuring that the load impedance of the LED lamp 20 falls within a predetermined range, in terms of between either one or both of the pair of input terminal parts (between the input terminal parts 20a, 20c) and/or the pair of input terminal parts (between the input terminal parts 20b, 20d).

Furthermore, the rectifier circuit unit 22 is constituted by a bridge diode composed of four diodes D4 to D7, and electrolytic capacitors C4, C5 connected in parallel so as to smooth a full-wave rectified waveform in the output stage of the bridge diode (see FIG. 2).

In output-side terminals of the rectifier circuit unit 22, a DC voltage is outputted between a high-voltage (HV)-side output terminal T7 and a ground-side output terminal T5.

A high-voltage (HV)-side output terminal T7 is connected to an anode-side terminal TA of the LED unit 24 through a smoothing circuit unit 23, and a cathode-side terminal TK of the LED unit 24 is connected to a PWM control unit 25 through the smoothing circuit unit 23.

Here, the LED unit 24 is constituted by a circuit in which three LED circuit groups, each comprising 30 LEDs (light-emitting diodes) having a forward voltage of about 3 V each and connected in series, are connected in parallel, and a current i flows in a direction (direction of the arrow) from the anode-side terminal TA to the cathode-side terminal TK.

Additionally, a GND terminal TG of the PWM control unit 25 is connected to the ground-side output terminal T5 on the output side of the rectifier circuit unit 22.

According to the circuit configuration mentioned above, the current i flowing through the LED unit 24 is PWM controlled by the PWM control unit 25 driving pulses at a frequency higher than a predetermined frequency, and falls within a predetermined current value range.

On the other hand, a bypass circuit unit 26 is connected between the cathode-side terminal TK of the LED unit 24 and the ground-side output terminal T5 of the rectifier circuit unit 22.

As a result, in the case where the frequency of the AC inputted to one terminal T3 of the rectifier circuit unit 22 is higher than the predetermined frequency, resistors R3, R4 and R5 are connected in parallel between the terminals T9 and TG even when the switching device Q1 is in the on state (the state where a current flows from the drain terminal to the source terminal; the same hereinafter), and thus the current i, which bypasses (circumvents) the PWM control unit 25 and flows through the LED unit 24, flows directly from the cathode-side terminal TK to the ground-side output terminal T5 of the rectifier circuit unit 22 though the GND terminal TG of the PWM control unit 25.

Hence, the current i hardly flows through the PWM control unit 25, and thus is not PWM controlled.

In the foregoing and following explanations, performing PWM (which is short for Pulse Width Modulation; the same hereinafter) control of the current i according to a duty ratio is defined as a period of a driving pulse that is fixed and controls the current i so as to switch on/off according to the duty ratio (the ratio of pulse width to pulse period, which has the same meaning as "on duty"; the same hereinafter) depending on the magnitude of an input signal (the magnitude of the voltage detected by a pin #2 which is a current sensor terminal in the present embodiment); the duty ratio at that moment is greater than 0% but smaller than 100%.

This can stabilize the magnitude of the current i flowing through the LED unit 24.

On the other hand, not performing PWM control of the current i according to a duty ratio is defined as the PWM control unit not controlling the current i so as to switch on/off according to the duty ratio; in addition to the case where the current i hardly flows through the PWM control unit as mentioned above, this encompasses both a case where the driving pulses have a duty ratio of 0% so that the switching device Q1 is always in the off state during operation, and a case where the driving pulses have a duty ratio of 100% so that the switching device Q1 is always in the on state during operation.

Individual constituent parts will now be explained in further detail with reference to FIGS. 2 and 3.

While the resistor R9 between the input terminal unit 20a and terminal T1 acts as a dummy resistor corresponding to the filament of the fluorescent lamp as mentioned above, the capacitor C9 allows an AC to pass therethrough in a normal operation state (when the LED unit 24 is lit).

This can shunt the AC in inverse proportion to the ratio between the capacitive reactance, determined by the frequency of the AC and the capacity of the capacitor C9, and the resistance value of the resistor R9, and thus proportionally suppresses the heat of the resistor R9.

Similarly, while the resistor R11 between the input terminal part 20c and the terminal T2 acts as a dummy resistor corresponding to the filament, the capacitor C11 allows the AC to pass therethrough in the normal operation state, and thus suppress the heat of the resistor R11.

Furthermore, a fuse F1 is used for overcurrent protection against the power supply current inputted between either one or both of the pair of input terminal parts (between input terminal parts 20a, 20c) and/or the pair of input terminal parts (between input terminal parts 20b, 20d).

Next, the rectifier circuit unit 22 has, in an upstream stage, the bridge diode constituted by the diode D4 whose anode and cathode are connected to the terminal T3 and the high-voltage (HV)-side output terminal T7, respectively, the diode D5 whose anode and cathode are connected to the terminal T6 and the high-voltage (HV)-side output terminal T7, respectively, the diode D6 whose anode and cathode are connected to the terminal T6 and a terminal T4 at the same potential as with the terminal T3, respectively, and the diode D7 whose anode and cathode are connected to the ground-side output terminal T5 and the terminal T6, respectively.

Furthermore, in a stage downstream of the bridge diode, the full-wave rectified waveform is smoothed, and thus the electrolytic capacitors C4, C5 are connected in parallel between the high-voltage (HV)-side output terminal T7 and the ground-side output terminal T5 so as to have plus (+) terminals on the high-voltage (HV)-side output terminal T7 side, and minus (−) terminals on the ground-side output terminal T5 side.

According to this, the smoothed DC-converted output voltage is outputted to the high-voltage (HV)-side output terminal T7, and the lower voltage part is outputted to the ground-side output terminal T5.

The pulsating component (ripple component) of the high DC voltage outputted to the high-voltage (HV)-side output terminal T7 is removed by the smoothing circuit unit 23, and this is called a choke coil input type smoothing circuit and is constituted by a series circuit of choke coils L1 to L4 and a parallel circuit of an electrolytic capacitor C3 with respect to the LED unit 24.

Additionally, the current i, from which the pulsating component has been removed by having passed through the smoothing circuit unit 23, flows from the anode-side terminal TA of the LED unit 24 to the cathode-side terminal TK, and functions to light a total of 90 LEDs (light-emitting diodes) constituting the LED unit 24 mentioned above.

The current i having passed through the smoothing circuit unit 23 from the LED unit 24 is PWM controlled by driving pulses at a predetermined oscillation period $t_{OSC}$ (µs) by the resistors R1 to R8, capacitors C1, C2, a zener diode D1, a diode D2 and the switching device Q1, which constitute the PWM control unit 25 and are connected to the integrated circuit IC1 and pins (#1 to #8).

When a commercially available model HV9910B (see FIG. 3) manufactured by Supertex, Inc. is used as the integrated circuit IC1, the oscillation period $t_{OSC}$ (µs) is controlled by the time obtained according to the following Formula 1 depending on the resistance value $R_T$ (kΩ) of the resistor R1 connected to the pin #8.

$$t_{OSC}(\mu s) = \frac{R_T(k\Omega) + 22}{25} \quad \text{[Formula 1]}$$

When the resistor R1 is set to about 499 (kΩ), for example, in the present embodiment, about 20.84 (µs) is determined as the oscillation period $t_{OSC}$ (µs) according to the above-mentioned Formula 1.

Therefore, if the oscillation period is about 20.84 (µs) as calculated, pulses can be driven at a high frequency of about 48 kHz.

Furthermore, the switching device Q1 controlling the on/off of the current i flowing through the LED unit 24 is an N-channel MOSFET which can control a current flow between drain and source terminals according to the input voltage at a gate terminal.

In the integrated circuit IC1, the drain terminal of the switching device Q1 is connected to the anode terminal of a diode D3 constituting a part of the smoothing circuit unit 23, the source terminal is connected to the terminal T9 connected to the pin #2, which is a current sensor terminal of the integrated circuit IC1, through the resistor R6, and a voltage of a proportion corresponding to that of the resistor R7, where the voltage outputted from the pin #4 of the integrated circuit IC1 has been divided by the resistors R2, R7, is inputted to the gate terminal.

Furthermore, the pin #1 of the integrated circuit IC1 is connected to the high-voltage (HV)-side output terminal T7 through the resistor R8 and zener diode D1, and thus is supplied with the high DC voltage outputted from the rectifier circuit unit 22.

As a consequence, the voltage (about 8 V DC to about 450 V DC) supplied from the pin #1 is lowered, rectified and stabilized by an internal regulator to a predetermined VDD voltage (about 12 V DC), functions as a power supply for driving the inner circuit of the integrated circuit IC1, and the VDD voltage is outputted to the pin #6 (see FIG. 3).

According to such connections as described above, when the voltage detected at the pin #2, which is the current sensor terminal, does not exceed a threshold voltage of about 250 mV DC by driving pulses of the integrated circuit IC1, a high-level voltage (about 7.5 V DC) is outputted to the gate terminal of the switching device Q1, switching it on, whereas when the voltage detected at the pin #2, which is the current sensor terminal, reaches the threshold voltage of about 250 mV DC, a low-level voltage (about 0 V) is outputted to the gate terminal of the switching device Q1, switching it off (a state where no current flows from the drain terminal to the source terminal; the same hereinafter).

In this way, the integrated circuit IC1 acts such that driving pulses outputting the voltage Vg1 at the gate terminal of the switching device Q1 have a fixed period, the duty ratio of the pulse width of the voltage Vg1 at the gate terminal is made variable according to the level of the voltage (current sensor terminal voltage Vcs) detected at the pin #2, and the current i flowing through the LED unit is controlled.

That is, the current i is PWM controlled by the high-frequency driven pulses of the PWM control unit, and thus repeatedly increases and decreases in pulses (in triangle waves) at the oscillation period $t_{OSC}$ (µs) obtained by the above-mentioned Formula I according to the switching device Q1 that is repeatedly switched on/off.

In the present embodiment, the pin #7 is connected to (has the same potential as) the pin #6, and thus the pin #7 is inputted with the voltage VDD (about 12 V DC) exceeding the above-mentioned threshold voltage (about 250 mV DC).

Furthermore, in the present embodiment, the threshold voltage to be compared with the voltage detected at the pin #2, which is the current sensor terminal, is set to about 250 mV DC generated within the integrated circuit IC1 (see FIG. 3).

On the other hand, when the voltage inputted to the pin #7 in the integrated circuit IC1 is set to a voltage within a range not exceeding about 250 mV DC, this can be set as a threshold voltage to be compared with the voltage detected by the current sensor terminal (pin #2), and thus the duty ratio can further be made variable in a downward direction.

This can lower the effective value (RMS value) of the current i flowing through the LED unit 24, thereby modulating (dimming) light.

Here, when the switching device Q1 is switched off, the series circuit of choke coils L1 to L4 generates a counter-electromotive force in such a direction as to allow the current i to flow, while the diode D3 for absorbing the current caused by the counter-electromotive force is connected in a forward direction from a terminal T8 at a terminal end of the choke coil L1 to the anode-side terminal TA of the LED unit 24.

On the other hand, as mentioned above, the bypass circuit unit 26 is disposed between the cathode-side terminal TK of the LED unit 24 and the ground-side output terminal T5 of the rectifier circuit unit 22.

The bypass circuit unit 26 includes a switching device Q2 and a high-pass filter circuit outputting a drive voltage (gate terminal voltage) to the switching device Q2.

Here, the switching device Q2 of the bypass circuit unit 26 is an N-channel MOSFET which controls a current flow between drain and source terminals according to a voltage inputted to a gate terminal, the drain terminal is connected to the cathode-side terminal TK of the LED unit 24, the source terminal is connected to the ground-side output terminal T5 of the rectifier circuit unit 22, and the gate terminal is connected to the terminal T4 of the rectifier circuit unit 22 through the high-pass filter circuit.

The high-pass filter circuit includes a first capacitor C6, a first resistor R13 connected in series to the first capacitor C6 so as to have one terminal connected to one terminal of the first capacitor, a first diode D9 connected in a forward direction from the other terminal of the first resistor R13 to the gate terminal of the switching device Q2, a second capacitor C7 connected between the source and gate terminals of the switching device Q2, a second resistor R14 connected between the source and gate terminals, a zener diode D10 connected in a forward direction from the source terminal to the gate terminal, and a second diode D8 connected a forward direction from the source terminal to the other terminal of the first resistor R13.

The other terminal of the first capacitor C6 is connected to any one of the input terminals (the terminal T3 or T6 through the terminal T4) of the rectifier circuit unit 22.

When circuit constants of the first capacitor C6, first resistor R13 and second resistor R14 are selected so as to cut off the AC inputted to the terminal T3 at a predetermined frequency or below, a CR circuit composed of the capacitor and resistors acts as a high-pass filter and thus only allows the AC having a frequency exceeding the predetermined frequency to pass therethrough to a stage downstream thereof.

That is, the AC having a frequency higher than the predetermined frequency inputted to the terminal T3 generates a DC voltage on the high voltage side of the second capacitor C7, second resistor R14 and zener diode D10, and a voltage capable of switching on the switching device Q2 is outputted to the gate terminal.

The voltage at the gate terminal can appropriately be set according to the potential division ratio between the first and second resistors R13, R14, and the zener voltage of the zener diode D10 limiting the voltage inputted to the gate terminal, but may be set so as to fall within a high-level gate terminal voltage range which can switch on the switching device Q2.

The high-pass filter circuit is an input circuit for a filter allowing an AC having a frequency higher than a predetermined frequency to pass therethrough, so as to set the gate terminal of the switching device Q2 to a high level (e.g. about 14 V DC), and thus may be connected to the terminal T6 to which the same AC (except for a 180°-difference in phase) is inputted as with the ground-side terminal T5 of the rectifier circuit unit 22.

According to the foregoing configuration, the high-pass filter outputs a predetermined gate voltage allowing a current to flow from the drain terminal to the source terminal when the AC inputted to the input terminal of the rectifier circuit unit 22 has a frequency higher than a predetermined frequency (in the present embodiment, a cutoff frequency in actual measurement being set to about 5 kHz by choosing a capacity of 100 pF for the first capacitor C6, a resistance value of 51 kΩ for the first resistor R13, and a resistance value of 51 kΩ for the second resistor R14; the same hereinafter), and outputs a gate voltage that does not allow a current to flow from the drain terminal to the source terminal when the AC has a frequency lower than a predetermined frequency.

That is, the switching device Q2 prevents flowing of a current from the cathode-side terminal TK of the LED unit 24 to the ground-side output terminal T5 of the rectifier circuit unit 22 through the GND terminal TG of the PWM control unit 25 when the AC has a frequency lower than the predetermined frequency (about 5 kHz), and makes it possible for a current to flow from the cathode-side terminal TK of the LED unit 24 to the ground-side output terminal T5 of the rectifier circuit unit 22 through the GND terminal TG of the PWM control unit 25 when the AC has a frequency higher than the predetermined frequency (hereinafter referred to as cutoff frequency; about 5 kHz).

As a result, when the external AC inputted to a pair of input terminal parts has a frequency lower than the predetermined frequency (e.g. when inputted from a ballast of the glow starter type or rapid start type), the current i flowing through the LED unit 24 is PWM controlled by the PWM control unit 25 driving pulses at a frequency higher than the predetermined frequency, producing pulse waves (triangle waves).

On the other hand, when the external AC inputted to a pair of input terminal parts has a frequency higher than the predetermined frequency (e.g. when inputted from a ballast of the inverter type), the PWM control unit 25 is bypassed (circumvented) through the bypass circuit unit 26, and thus the current i flowing through the LED unit 24 flows as is to the ground-side output terminal T5 of the rectifier circuit unit 22 without PWM control being performed by the PWM control unit 25.

Figure 6:
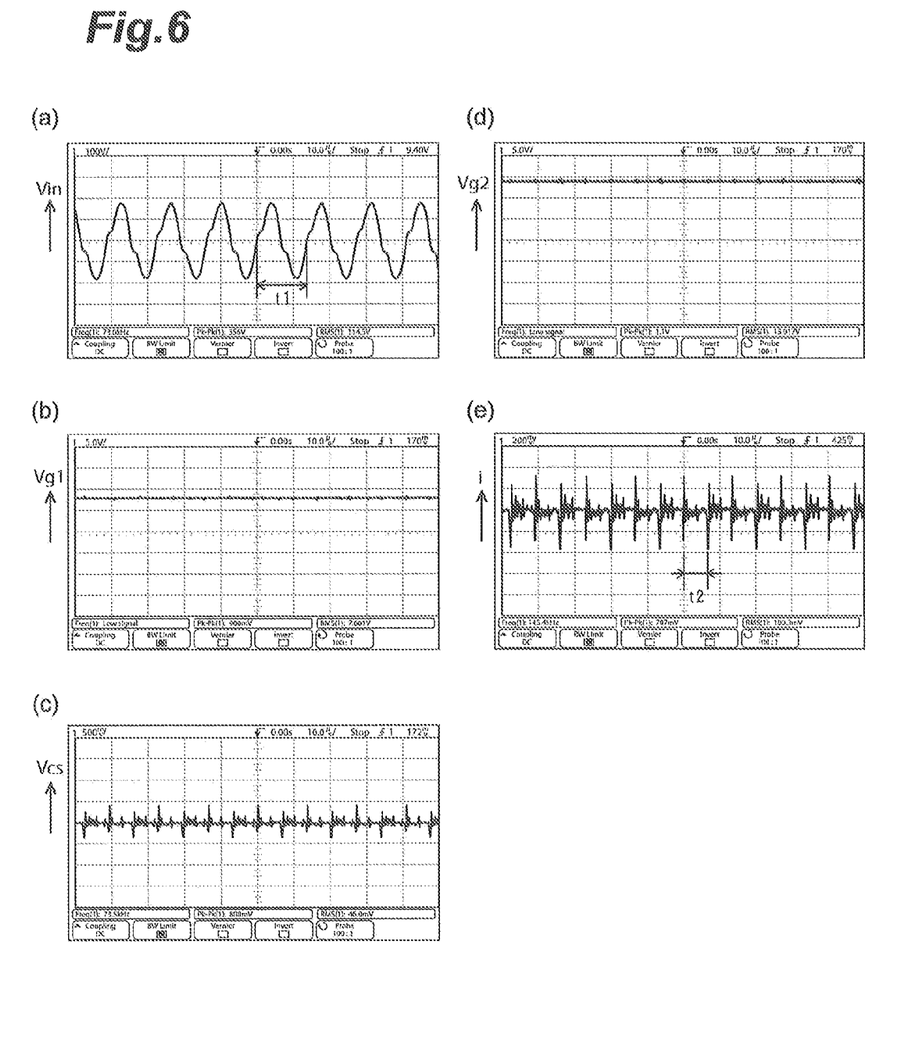
FIGS. 6(a), 6(b), 6(c), 6(d) and 6(e), respectively, are waveforms of an input voltage Vin, a voltage Vg1 at a gate terminal of a switching device Q1, a current sensor terminal voltage Vcs of an integrated circuit IC1, a voltage Vg2 at a gate terminal of a switching device Q2, and a current i flowing through an LED unit 24.

Therefore, the AC having a high frequency inputted to a pair of input terminal parts only passes through the rectifier circuit 22, smoothing circuit unit 23 and LED unit 24, and thus the current i flowing through the LED unit 24 attains a waveform in which the AC inputted to the pair of input terminal parts is converted to a DC by full-wave rectification (e.g. see FIG. 6(*e*)).

Observed waveforms of the input voltage Vin at the pair of input terminal parts (between the input terminal parts 20*a*, 20*c*), voltage Vg1 at the gate terminal of the switching device Q1, current sensor terminal voltage Vcs at the pin #2 of the integrated circuit IC1, voltage Vg2 at the gate terminal of the switching device Q2 and current i flowing through the LED unit 24 will now be explained according to types of the ballast 12, with reference to FIGS. 4 to 6.

Here, each of the gate terminal voltages Vg1, Vg2 and current sensor terminal voltage Vcs are measured while taking the GND terminal TG of the PWM control unit 25 as a reference (ground level).

Figure 4:
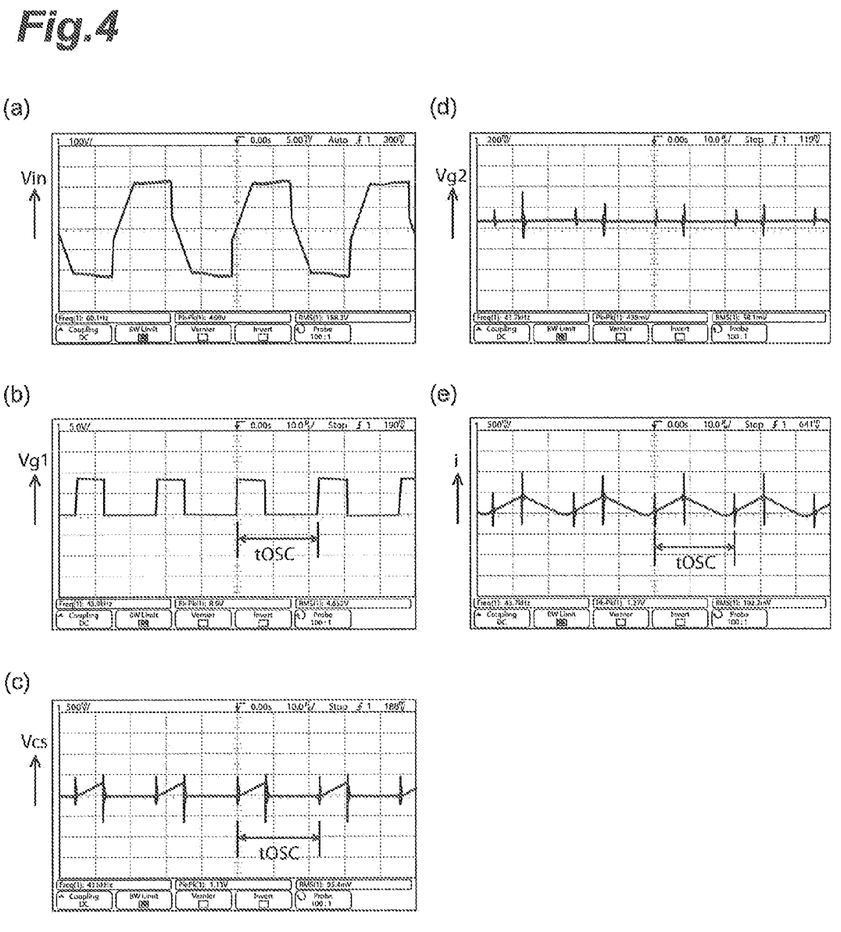
FIGS. 4(a), 4(b), 4(c), 4(d) and 4(e), respectively, are waveforms of an input voltage Vin, a voltage Vg1 at a gate terminal of a switching device Q1, a current sensor terminal voltage Vcs of an integrated circuit IC1, a voltage Vg2 at a gate terminal of a switching device Q2, and a current i flowing through an LED unit 24.
Figure 5:
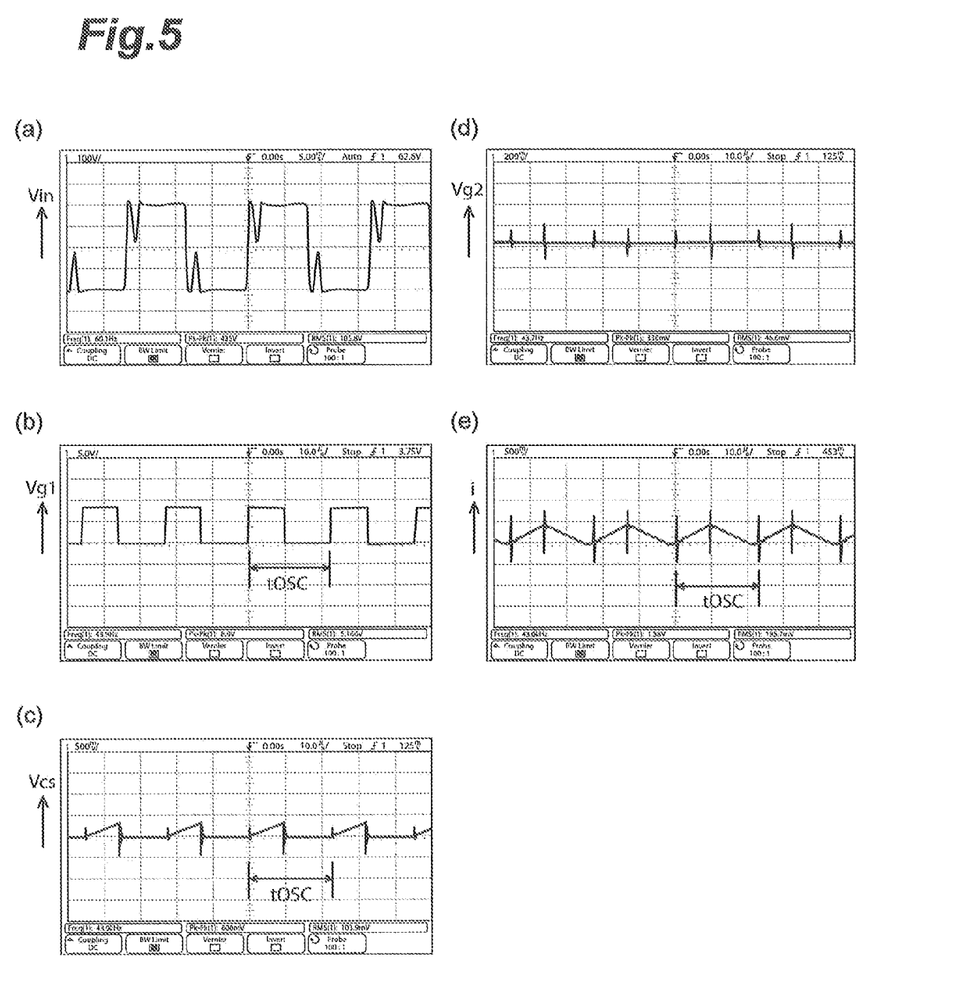
FIGS. 5(a), 5(b), 5(c), 5(d) and 5(e), respectively, are waveforms of an input voltage Vin, a voltage Vg1 at a gate terminal of a switching device Q1, a current sensor terminal voltage Vcs of an integrated circuit IC1, a voltage Vg2 at a gate terminal of a switching device Q2, and a current i flowing through an LED unit 24.

The current i flowing through the LED unit 24 illustrated in FIGS. 4(*e*), 5(*e*) and 6(*e*) is observed as a voltage drop on an inserted resistance (1 Ω) when a total current flowing through the LED unit 24 (a total of 90 LEDs) is inputted to the resistance; the ordinate in each of FIGS. 4(*e*) and 5(*e*) corresponds to 500 mA/div, and the ordinate in FIG. 6(*e*) corresponds to 200 mA/div.

FIGS. 4(*a*), 4(*b*), 4(*c*), 4(*d*) and 4(*e*), respectively, illustrate waveforms of the input voltage Vin, voltage Vg1 at the gate terminal of the switching device Q1, current sensor terminal voltage Vcs of the integrated circuit IC1, voltage Vg2 at the gate terminal of the switching device Q2 and current i flowing through the LED unit 24, when the ballast 12 used is of the glow starter type (with a secondary voltage of 200 V and a secondary current of 0.42 A).

First, as illustrated in FIG. 4(*a*), a utility power frequency of 60.1 Hz is observed as a waveform frequency of the input voltage Vin.

Since this frequency is lower than the cutoff frequency set to about 5 kHz, the integrated circuit IC1 of the PWM control unit 25 drives pulses so as to output the voltage Vg1 at the gate terminal of the switching device Q1 whose oscillation period $t_{OSC}$ (μs) is about 22.78 (μs) in actual measurement as illustrated in FIG. 4(*b*).

Here, the switching device Q1 is pulse-driven at a frequency of about 43.9 kHz by alternately inputting the gate terminal with voltages at a high level (about 7.5 V DC) and a low level (about 0 V) with a duty ratio of about 33%.

As illustrated in FIG. 4(*c*), this is due to a PWM control action of the integrated circuit IC1, which outputs voltages at the high level (about 7.5 V DC) to the gate terminal of the switching device Q1 until the current sensor terminal voltage Vcs reaches about 250 mV DC, and outputs voltages at the low level (about 0 V) to the gate terminal of the switching device Q1 after the current sensor terminal voltage Vcs reaches about 250 mV DC.

When the voltage at the high level (about 7.5 V DC) is inputted to the gate terminal of the switching device Q1, switching it on, a current flows through the resistors R3 to R5, thereby linearly raising the current i flowing through the LED unit 24; when the voltage at the low level (about 0 V) is inputted to the gate terminal of the switching device Q1, the switching device Q1 switches off, and thus the current sensor terminal voltage Vcs drops to the ground level (0 V).

On the other hand, since the frequency of the waveform of the input voltage Vin is lower than the cutoff frequency that was set to about 5 kHz, only a voltage of about 50 mV DC is inputted to the gate terminal of the switching device Q2 through the above-mentioned high-pass filter circuit as illustrated in FIG. 4(d), switching off the switching device Q2, and thus a current does not flow from the drain terminal to the source terminal.

Hence, as illustrated in FIG. 4(e), the current i flowing through the LED unit 24 flows in synchronization with the voltage Vg1 at the gate terminal of the switching device Q1, rises when the switching device Q1 is switched on, and begins to fall when the switching device Q1 is switched off (the counter-electromotive force caused by the choke coils L1 to L4 keeps the current i from immediately dropping to 0 A).

That is, the current i flowing through the LED unit 24 is PWM controlled by the PWM control unit 25 driving pulses at a frequency of about 43.9 kHz, as illustrated in FIG. 4(b).

As a result, as illustrated in FIG. 4(e), the current i flowing through the LED unit 24 is outputted as pulses (triangle waves) at a frequency of 43.7 kHz, which is higher than the cutoff frequency of 5 kHz in the frequency measurement, and was observed as about 192.2 mA in effective value (RMS value) measurement.

FIGS. 5(a), 5(b), 5(c), 5(d) and 5(e), respectively, illustrate waveforms of the input voltage Vin, voltage Vg1 at the gate terminal of the switching device Q1, current sensor terminal voltage Vcs of the integrated circuit IC1, voltage Vg2 at the gate terminal of the switching device Q2 and current i flowing through the LED unit 24, when the ballast 12 used is of the rapid start type (with a secondary voltage of 190 V and a secondary current of 0.42 A).

First, as illustrated in FIG. 5(a), a frequency of 60.1 Hz is observed as a waveform frequency of the input voltage Vin.

Since this frequency is lower than the cutoff frequency that was set to about 5 kHz, the integrated circuit IC1 of the PWM control unit 25 drives pulses so as to output the voltage Vg1 at the gate terminal of the switching device Q1 whose oscillation period $t_{OSC}$ (μs) is about 22.78 (μs) in actual measurement, as illustrated in FIG. 5(b).

Here, the switching device Q1 is pulse-driven at a frequency of about 43.9 kHz by alternately inputting voltages at a high level (about 7.5 V DC) and a low level (about 0 V) with a duty ratio of about 43% to the gate terminal.

As illustrated in FIG. 5(c), this is due to a PWM control action of the integrated circuit IC1, which outputs voltages at the high level (about 7.5 V DC) to the gate terminal of the switching device Q1 until the current sensor terminal voltage Vcs reaches about 250 mV DC, and outputs voltages at the low level (about 0 V) to the gate terminal of the switching device Q1 after the current sensor terminal voltage Vcs reaches about 250 mV DC.

When the voltage at the high level (about 7.5 V DC) is inputted to the gate terminal of the switching device Q1, switching it on, a current flows through the resistors R3 to R5, thereby linearly raising the current i flowing through the LED unit 24; when the voltage at the low level (about 0 V) is inputted to the gate terminal of the switching device Q1, the switching device Q1 switches off, and thus the current sensor terminal voltage Vcs drops to the ground level (0 V).

On the other hand, since the frequency of the waveform of the input voltage Vin is lower than the cutoff frequency that was set to about 5 kHz, only a voltage of about 50 mV DC is inputted to the gate terminal of the switching device Q2 through the above-mentioned high-pass filter circuit as illustrated in FIG. 5(d), switching off the switching device Q2, and thus a current does not flow from the drain terminal to the source terminal.

Hence, as illustrated in FIG. 5(e), the current i flowing through the LED unit 24 flows in synchronization with the voltage Vg1 at the gate terminal of the switching device Q1, rises when the switching device Q1 is switched on, and begins to fall when the switching device Q1 is switched off (the counter-electromotive force caused by the choke coils L1 to L4 keeps the current i from immediately dropping to 0 A).

That is, the current i flowing through the LED unit 24 is PWM controlled by the PWM control unit 25 driving pulses at a frequency of about 43.9 kHz, as illustrated in FIG. 5(b).

Consequently, as illustrated in FIG. 5(e), the current i flowing through the LED unit 24 is outputted as pulses (triangle waves) at a frequency of 43.6 kHz, which is higher than the cutoff frequency of 5 kHz in the frequency measurement, and was observed as about 195.7 mA in effective value (RMS value) measurement.

FIGS. 6(a), 6(b), 6(c), 6(d) and 6(e), respectively, illustrate waveforms of the input voltage Vin, voltage Vg1 at the gate terminal of the switching device Q1, current sensor terminal voltage Vcs of the integrated circuit IC1, voltage Vg2 at the gate terminal of the switching device Q2 and current i flowing through the LED unit 24, when the ballast 12 used is of the inverter type (with a secondary voltage of 280 V and a secondary current of 0.225 A under no load).

First, as illustrated in FIG. 6(a), in the waveform of the input voltage Vin, the period t1 is about 13.7 (μs), and a frequency of 73.0 kHz is observed.

Since this frequency is higher than the cutoff frequency that was set to about 5 kHz, the gate terminal of the switching device Q2 is inputted with the voltage Vg2 at a high level (about 14 V DC) as illustrated in FIG. 6(d), and thus the switching device Q2 is always in the on state.

However, the resistors R3, R4, R5 are connected in parallel between the terminals T9, TG as mentioned above, and thus the current i having flowed through the LED unit 24 hardly flows through the PWM control unit 25, and flows directly from the cathode-side terminal TK of the LED unit 24 to the ground-side output terminal T5 of the rectifier circuit unit 22 through the GND terminal TG of the PWM control unit 25.

As a result, the current i does not flow through the resistors R3 to R5, and thus the current sensor terminal voltage Vcs is stable at the ground level (0 V) as illustrated in FIG. 6(c), the duty ratio of the driving pulses becomes 100% as illustrated in FIG. 6(b), the voltage Vg1 at the gate terminal of the switching device Q1 in the PWM control unit 25 is always at the high level (about 7.5 V DC), and the switching device Q1 is in the on state.

Hence, the PWM control unit 25 does not perform PWM control of the current i flowing through the LED unit 24.

As illustrated in FIG. 6(e), the current i flowing through the LED unit 24 attains a waveform in which the input voltage Vin is full-wave rectified without PWM control by the PWM control unit 25, and was observed as about 199.3 mA in effective value (RMS value) measurement.

Furthermore, without the PWM control by the driving pulses of the PWM control unit 25, the period t2 of the ripple voltage waveform part superposed on the DC becomes about 6.9 (μs), and the frequency of the current i flowing through the LED unit 24 was observed as about 145.4 kHz, which is twice as high as that of the input voltage Vin.

Therefore, it could be confirmed that the frequency of the ripple voltage waveform part of the current i flowing through the LED unit 24 becomes twice as high as that of the input voltage Vin through full-wave rectification.

From the foregoing observations, it was confirmed that 190 mA to 200 mA can be obtained in actual measurement as an effective value (RMS value) of the current i flowing through the LED unit 24, and the latter can be lit for illumination, regardless of whether the ballast 12 of the illumination device 10 is of the glow starter, rapid start or inverter lighting type.

It was also confirmed that, when the ballast 12 is of the glow starter or rapid start type, the current i flowing through the LED unit 24 is PWM controlled by the PWM control unit 25 driving pulses at a frequency of about 43.6 to 43.7 kHz, which is higher than the cutoff frequency of 5 kHz, since the frequency of the input voltage Vin is about 60 Hz.

When the ballast 12 is of the inverter type, on the other hand, it was confirmed that the frequency of the input voltage Vin is about 73.0 kHz, which is higher than the cutoff frequency of 5 kHz, and thus the current i flowing through the LED unit 24 is about 145.4 kHz and is not PWM controlled by the PWM control unit 25 driving pulses.

The technical scope of the present invention is not limited to any of the embodiments mentioned above but may be modified in various ways within the scope set forth in the claims, and includes modified examples of the embodiments which can be obtained by appropriately combining technical means respectively disclosed in different embodiments.

For example, a pair of input terminal parts is meant to include at least one pair of input terminal parts; when there are four input terminal parts (two on each side), i.e. as in terminals on both end parts of a straight tube fluorescent lamp, it would be sufficient for an external AC to be inputted to at least two of the input terminal parts (two terminals from one side or both sides).

When two terminals are connected to each other simply with a lead through another terminal, the above-mentioned description of embodiments assumes that the two terminals are directly connected to each other (at the same potential), and ignores the wiring resistance and the like.

Furthermore, the predetermined frequency distinguishing the frequency of the AC inputted to the pair of input terminal parts is preferably about 5 kHz (cutoff frequency) which can distinguish between a utility power frequency (50 Hz or 60 Hz) in the case of the glow starter or rapid start type ballast, and a high frequency (about 20 kHz to 100 kHz) in the case of the inverter type, but may appropriately be set so as to become a desirable frequency within the frequency range of higher than 65 Hz but lower than 20 kHz by changing circuit constants in the high-pass filter circuit.

Similarly, the frequency and duty ratio of pulses driven by the PWM control unit may be set by appropriately configuring resistors connected to pins, drive voltage and the like within the spec range of the integrated circuit IC1 in view of the current flowing through the LED unit (illuminance), the heat of the switching device in the PWM control unit, and the like.

In particular, circuit configurations and circuit constants in the circuit diagrams used for reference may appropriately be selected within a range included in the technical scope of the present invention as long as they achieve the intended objective of the present invention and yield desired effects, even when not clearly specified in the above-mentioned description of embodiments.

Figure 7:
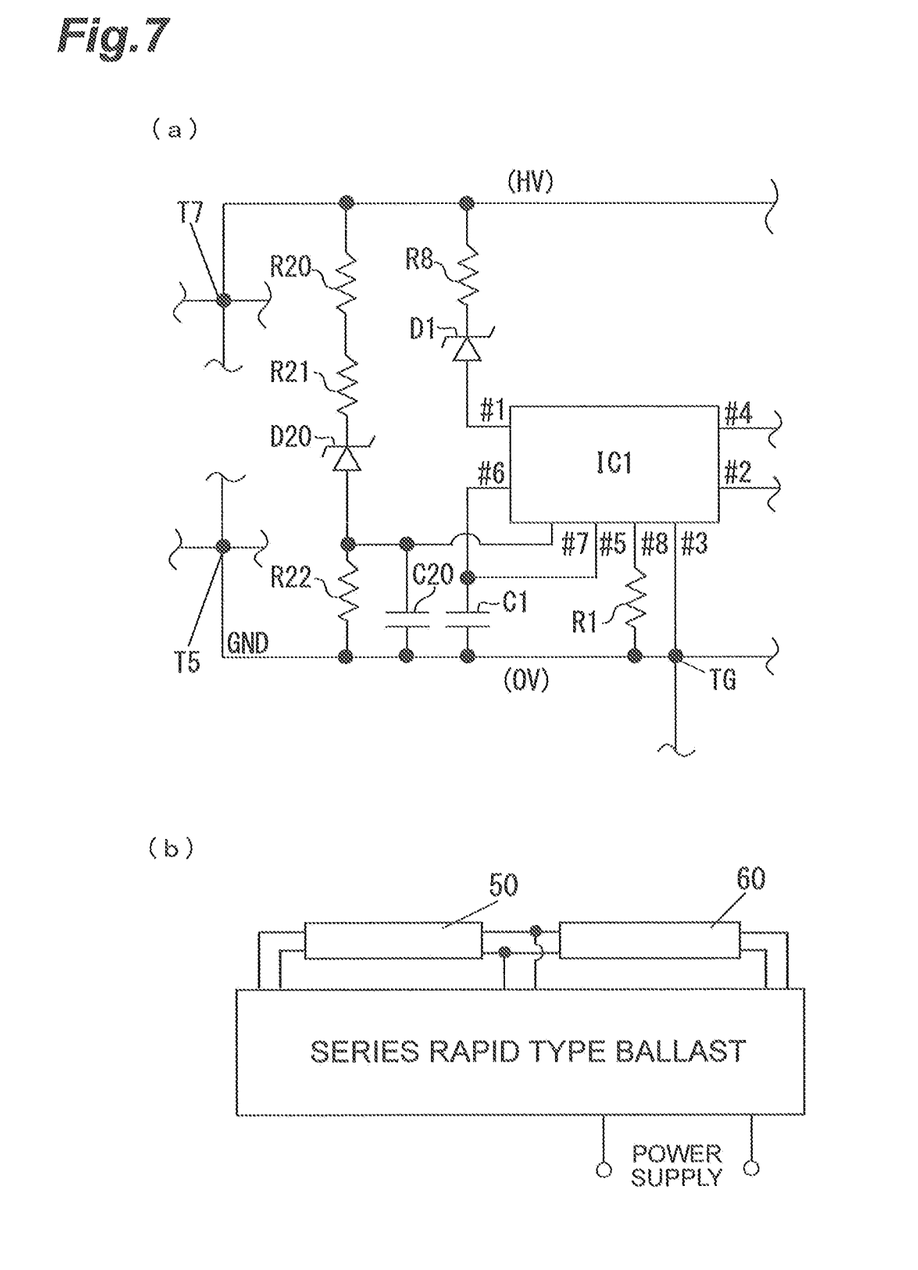

Furthermore, as illustrated in FIG. 7(*a*), connecting a plurality of resistors R20, R21, a zener diode D20 and a resistor R22 in series between the high-voltage (HV)-side output terminal T7 and the ground-side output terminal T5, and inputting a DC voltage (a voltage which is lower than about 250 mV DC and proportional to the magnitude of the high voltage (HV)), which has been divided at the resistor R22, to the pin #7 of the integrated circuit IC1, enables the threshold voltage to be made variable in proportion to the magnitude of the voltage inputted to the pair of input terminal parts.

For example, selecting 1 MΩ as the resistance value of the resistor R20, 1 MΩ as the resistance value of the resistor R21, 51 V as the zener voltage of the zener diode D20, 3.65 kΩ as the resistance value of the resistor R22 and 1 μF as the capacitance of the capacitor C20 inputs about 215 mV in actual measurement to the pin #7 of the integrated circuit IC1 when 165 V is outputted through the high-voltage (HV)-side output terminal T7.

In this way, the voltage inputted to the pair of input terminal parts, and the current flowing through the LED unit that is PWM controlled, increase and decrease in proportion to each other, and thus the input impedance of the whole LED lamp in terms of the pair of input terminal parts is made positive (the flowing current increases proportionally as the input voltage becomes higher).

Hence, even when LED lamps 50, 60 according to the embodiment are connected in series in a series rapid type ballast as illustrated in FIG. 7(*b*), the voltage inputted from the series rapid type ballast is proportionally distributed according to their respective input impedances, thus facilitating the flow of the same drive current through both, and also enabling the LED lamps in the present embodiment to be connected in series.

Industrial Applicability

As in the foregoing, the LED lamp and the illumination device including the LED lamp of the present invention can be applied for use as an LED lamp, and an illumination device including the LED lamp, capable of being lit by driving pulses at a high frequency, by replacing a previously mounted fluorescent lamp (or LED lamp), regardless of whether a ballast of a fluorescent lamp lighting device is of the glow starter, rapid start or inverter lighting type.

| Reference Signs List | |
|---|---|
| 10 | illumination device |
| 11 | plug |
| 12 | ballast |
| 20, 50, 60 | LED lamp |
| 20a, 20b, 20c, 20d | input terminal part |
| 21 | protection circuit unit |
| 22 | rectifier circuit unit |
| 23 | smoothing circuit unit |
| 24 | LED unit |
| 25 | PWM control unit |
| 26 | bypass circuit unit |
| C1, C2, C9, C10, C11, C12, C20 | capacitor |
| C3, C4, C5 | electrolytic capacitor |
| C6 | first capacitor |
| C7 | second capacitor |

-continued

| Reference Signs List | |
|---|---|
| D2, D3, D4, D5, D6, D7 | diode |
| D8 | second diode |
| D9 | first diode |
| D1, D10, D20 | zener diode |
| Z9, Z10, Z11, Z12 | input circuit unit |
| HV | high voltage |
| F1 | fuse |
| IC1 | integrated circuit |
| L1, L2, L3, L4 | choke coil |
| L5 | coil |
| L6 | coil |
| Q1, Q2 | switching device |
| R1, R2, R3, R4, R5, R6, R7, R8, R9, R10, R11, R12, R20, R21, R22 | resistor |
| R13 | first resistor |
| R14 | second resistor |
| SA1 | two-electrode discharge tube |
| SA2 | varistor |
| T1, T2, T3, T4, T6, T8, T9 | terminal |
| T5 | ground-side output terminal |
| T7 | high-voltage (HV)-side output terminal |
| TA | anode-side terminal |
| TK | cathode-side terminal |
| TG | GND terminal |
| Vin | input voltage |
| Vcs | current sensor terminal voltage |
| Vg1 | voltage at the gate terminal of the switching device Q1 |
| Vg2 | voltage at the gate terminal of the switching device Q2 |
| i | current flowing through the LED unit |
| $t_{OSC}$ | oscillation period |

The invention claimed is:

1. An LED lamp including a pair of input terminal parts, a rectifier circuit unit rectifying an AC inputted from outside to the pair of input terminal parts to a DC, and an LED unit emitting light by electrification of the DC outputted from the rectifier circuit unit wherein:
 a PWM control unit capable of performing PWM control of a current to flow through the LED unit according to a duty ratio is provided in a circuit between the rectifier circuit unit and the LED unit;
 the PWM control unit is switchable between a case where the PWM control of the current flowing through the LED unit is performed, and a case where the PWM control of the current flowing through the LED unit is not performed, according to a frequency of external AC inputted to the pair of input terminal parts; and
 the PWM control unit performs the PWM control of the current flowing through the LED unit by driving a pulse at a frequency higher than a predetermined frequency when the frequency of the external AC inputted to the pair of input terminal parts is lower than the predetermined frequency, and does not perform the PWM control of the current flowing through the LED unit when the frequency of the external AC inputted to the pair of input terminal parts is higher than the predetermined frequency.

2. The LED lamp according to claim 1, wherein a bypass circuit unit is provided between a cathode-side terminal of the LED unit and a ground-side output terminal of the rectifier circuit unit;
 wherein the bypass circuit unit includes a switching device and a high-pass filter circuit outputting a drive voltage for the switching device; and
 wherein the switching device does not allow a current to flow from the cathode-side terminal of the LED unit to the ground-side output terminal of the rectifier circuit unit when the AC inputted to the pair of input terminal parts has the frequency lower than the predetermined frequency, and allows a current to flow from the cathode-side terminal of the LED unit to the ground-side output terminal of the rectifier circuit unit when the AC inputted from the pair of input terminal parts has the frequency higher than the predetermined frequency.

3. The LED lamp according to claim 2, wherein the switching device of the bypass circuit unit is an N-channel MOSFET controlling a current flow between drain and source terminals according to a gate voltage inputted to a gate terminal;
 wherein the drain terminal is connected to the cathode-side terminal of the LED unit;
 wherein the source terminal is connected to the ground-side output terminal of the rectifier circuit unit;
 wherein the gate terminal is connected to any one of input terminals of the rectifier circuit unit through the high-pass filter circuit; and
 wherein the high-pass filter circuit outputs a gate voltage to the gate terminal driven so as to allow a current to flow from the drain terminal to the source terminal when the AC inputted to the pair of input terminal parts has the frequency higher than the predetermined frequency, and outputs a gate voltage to the gate terminal driven so as not to allow a current to flow from the drain terminal to the source terminal when the AC inputted to the pair of input terminal parts has the frequency lower than the predetermined frequency.

4. The LED lamp according to claim 3, wherein the high-pass filter circuit includes:
 a first capacitor;
 a first resistor connected in series to the first capacitor so as to have one terminal connected to one terminal of the first capacitor;
 a first diode connected in a forward direction from the other terminal of the first resistor to the gate terminal;
 a second capacitor connected between the source and gate terminals;
 a second resistor connected between the source and gate terminals;
 a zener diode connected a forward direction from the source terminal to the gate terminal; and
 a second diode connected a forward direction from the source terminal to the other terminal of the first resistor;
 wherein the other terminal of the first capacitor is connected to any one of the input terminals of the rectifier circuit unit.

5. The LED lamp according to claim 1, wherein the predetermined frequency is a frequency higher than 65 Hz but lower than 20 kHz.

6. An illumination device including the LED lamp according to claim 1.

7. The LED lamp according to claim 2, wherein the predetermined frequency is a frequency higher than 65 Hz but lower than 20 kHz.

8. The LED lamp according to claim 3, wherein the predetermined frequency is a frequency higher than 65 Hz but lower than 20 kHz.

9. The LED lamp according to claim 4, wherein the predetermined frequency is a frequency higher than 65 Hz but lower than 20 kHz.

* * * * *